(12) United States Patent
Jonnala et al.

(10) Patent No.: US 7,392,407 B2
(45) Date of Patent: Jun. 24, 2008

(54) METHOD AND APPARATUS FOR NEGOTIATING POWER BETWEEN POWER SOURCING EQUIPMENT AND POWERABLE DEVICES

(75) Inventors: Premkumar Jonnala, Hayward, CA (US); Norman W. Finn, Livermore, CA (US); Qiang Wu, San Jose, CA (US); Ruchir M. Dave, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 330 days.

(21) Appl. No.: 11/055,512

(22) Filed: Feb. 9, 2005

(65) Prior Publication Data

US 2006/0177192 A1    Aug. 10, 2006

(51) Int. Cl.
*G06F 1/00* (2006.01)
*G06F 1/26* (2006.01)
*G06F 1/32* (2006.01)

(52) U.S. Cl. ...................................... 713/300; 713/320
(58) Field of Classification Search ................. 713/300, 713/320
See application file for complete search history.

(56) References Cited

U.S. PATENT DOCUMENTS

| | | | | |
|---|---|---|---|---|
| 5,793,987 A | * | 8/1998 | Quackenbush et al. | 710/100 |
| 6,026,494 A | * | 2/2000 | Foster | 713/320 |
| 7,031,266 B1 | * | 4/2006 | Patel et al. | 370/254 |
| 2002/0141217 A1 | * | 10/2002 | Cohen et al. | 363/146 |
| 2003/0163224 A1 | * | 8/2003 | Klaar et al. | 700/286 |

OTHER PUBLICATIONS

IEEE Draft P802.3af/D4.3, Amendment: Data Terminal Equipment (DTE) Power via Media Dependent Interface (MDI), Institute of Electrical and Electronics Engineers, Inc., 132 pages, Apr. 2003.

* cited by examiner

*Primary Examiner*—Thomas Lee
*Assistant Examiner*—Michael Wang
(74) *Attorney, Agent, or Firm*—Sierra Patent Group, Ltd.

(57) ABSTRACT

The present invention provides a power negotiation protocol that enables PDs and PSEs to negotiate the amount of inline power that a PD consumes and the corresponding PSE provides. This power negotiation allows the PDs provide fine-grained power consumption level to PSEs, and the PSEs are able to manage inline power efficiently using the negotiation protocol of the present invention. The PDs can ask the PSEs for more power when needed rather than having to constantly reserve the maximum amount of power they can consume at all times. Similarly, the PDs can release reservation of excess power when their respective power requirements decrease. The PSEs can limit the amount of power that can be consumed by the PD, thereby providing the ability for an administrator to control how much power a given PD can consume.

1 Claim, 12 Drawing Sheets

METHOD AND APPARATUS FOR NEGOTIATING POWER BETWEEN POWER SOURCING EQUIPMENT AND POWERABLE DEVICES

BACKGROUND

With the introduction of IEEE 802.3af standard, the number of inline powerable devices (PDs) having varying power consumption levels is expected to increase. Similarly, there is power-sourcing equipment (PSE) that supports the different levels of power that it can provide. For example, Cisco Systems, Inc. produces inline power cards that support 6.3 W devices. For backward compatibility, there are IEEE PDs that utilize the Cisco Discovery Protocol (CDP). Thus, there are combinations of PDs and PSEs that need some negotiation to make sure that the PDs don't oversubscribe the PSE. For example, it's required that a 15 W PD doesn't consume more than 6.3 W on old inline power cards.

Currently, IEEE classifications exist to denote ranges of power consumption of PDs. However, these classifications are very coarse. For example, IEEE Class 3 devices consume anywhere from 7 W to 15.4 W. This means that an IEEE Class 3 device that needs only 7 W actually requires 15.4 W to be allocated by the PSE. Power management by the PSE's power manager is therefore inefficient, and there is a need for power negotiation between PDs and PSEs that overcomes this problem.

SUMMARY

The present invention provides a power negotiation protocol that enables PDs and PSEs to negotiate the amount of inline power that a PD consumes and the corresponding PSE provides. This power negotiation allows the PDs provide fine-grained power consumption level to PSEs, and the PSEs are able to manage inline power efficiently using the negotiation protocol of the present invention.

The power negotiation of the present invention aids interoperability of PDs and PSEs in an environment where there are multiple types of PDs and/or multiple types of PSEs, each type taking or providing different power levels respectively. Such interoperability does not require any manual intervention and therefore provides a plug-and-play functionality. A given PD is not allowed to consume more power than can be provided by the PSE. This is needed especially when the amount of power consumed by a PD cannot be determined by a PSE before the PD is powered.

The PDs can ask the PSEs for more power when needed rather than having to constantly reserve the maximum amount of power they can consume at all times. Similarly, the PDs can release reservation of excess power when their respective power requirements decrease. The PSEs can limit the amount of power that can be consumed by the PD, thereby providing the ability for an administrator to control how much power a given PD can consume.

DETAILED DESCRIPTION

The protocol of the present invention ensures that at any moment the amount of power consumed by a PD is not more than the amount of power allocated by the PSE for the given PD. The protocol of the present invention also ensures that PDs do not consume more than the amount of power configured by an administrator on the PSE.

The protocol of the present invention assumes that all PSEs supporting power negotiation with PDs are capable of providing a certain minimum amount of power (referred to herein as MinP). It's also assumed that PDs supporting the negotiation are capable of coming up and running power negotiation at MinP.

The operation and management of the protocol provided by the present invention are managed by protocol subsystems on respective PSEs and PDs. These protocol subsystems maintain their own copies of data and interact with their respective power managers.

A power manager on a PD uses its protocol subsystem to change its power levels. It asks its protocol subsystem for more power by requesting a new power mode and waits for its notification before moving to a higher power mode. Similarly, the power manager on the PD notifies its protocol subsystem of reduced power consumption requirements when its consumption requirements decrease. The power manager on PD may just be a simple user interface that users interactively manage or a more complex system that is transparent to a user.

The power manager on a PSE is responsible for allocating power when a PD asks for it. The power manager on a PSE is also responsible for either accepting or denying a PD's request for new power modes. This may be performed based on the amount of remaining unallocated power and user configuration.

A PD inserts the following pieces of information into protocol packets that are sent out during the negotiation process.
1. Consumption—the amount of power consumed by the PD at the time the message was sent.
2. Request Sequence Number (generated by PD)—used by the PD and PSE to differentiate one PD request from another.
3. Management Sequence Number (generated by PSE)—used by the PD and PSE to differentiate one PSE request from another.
4. Request Set of Power Levels—generated by PD to specify the set of power levels, one of which it desires to switch to. Used by PSE to select one of the levels.
5. Trigger value.

A PSE inserts the following information in protocol packets that it sends out during the negotiation process.
1. Request Sequence Number—generated by a PD
2. Management Sequence Number—generated by a PSE
3. Available Power—generated by a PSE. PSE uses this field to specify the amount of power available to the PD.
4. Management Power—generated by PSE. PSE uses this field to specify the maximum amount of power that PD may consume after the receipt of the protocol packet.
5. Trigger value.

PDs come up in a power mode that consumes not more than the power level specified by MinP. After being powered, a PD starts advertising its requests by placing the requested set of power levels in its outgoing protocol packets. The PD may change its consumption after the receipt of packets from PD having request sequence number matching the number that PD used when it sent the requests out. The amount of power consumed in such case may not be more than the minimum of management and available power levels indicated in PSE protocol packets.

Whenever PD plans to increase its power consumption beyond the current level, it places the requested set of levels in its outgoing packets and increments request sequence number indicating new request. The PD can increase its consumption only after acknowledgement from PSE that indicates that enough amount of power has been allocated at the PSE.

Conversely, when a PD plans to decrease its consumption, it can do so immediately without waiting for PSEs acknowledgement. When PD specifies this in its outgoing packets by adjusting the requested set of levels and request sequence number, the PSE can deallocate power beyond the PD's latest rate of power consumption.

The protocol packets from PSE also carry management information from PSE. The PD obeys the requests from PSE and adjusts accordingly. The flowchart for PD handles all combinations of PD power manager requests, PSE power manager requests and PSE acknowledgements.

The protocol requires that a PD maintain the following pieces of information.
1. Last Received Protocol Data from PSE (referred to herein as lastRxPseProtData), and,
2. Protocol Data last transmitted by the PD (referred to herein as lastTxPdProtData).

The state maintained by the PD is be initialized as below:
1. Last Received PSE Protocol Data:
Management Sequence Number (referred to herein as mgmtSeqNum) set to 0.
Request Sequence Number (referred to herein as reqSeqNum) set to 0.
Available Power (referred to herein as availPower) set to MinP.
Management Power (referred to herein as mgmtPower) set to −1.
Trigger (trigger) set to 0.
2. Protocol Data last transmitted by the PD:
Consumption set to MinP.
Request Sequence Number (reqSeqNum) set to a non-zero random value.
Management Sequence Number (mgmtSeqNum) set to 0.
Request Set of Power Levels (referred to herein as reqSetOfPowerLevels) set to list of power modes that PD requests to transition to.
Trigger set to false.

PSEs discover PDs and power them up. Once a PD has been powered, the PSE waits for messages from PD. These initial messages from PDs are requests to transition away from initial MinP (low power) mode. PSEs process requests from power managers for controlling PD power level, acknowledgements from PDs for PSE requests and requests from PDs for new power modes in order as described in the flowchart.

FIGS. 1A-1F illustrate in flowchart form how the present invention handles all three cases at once to enable PSE implementation do background processing of, requests from power manager and messages from PSE. The description below, as well as FIGS. 1A-1F and FIGS. 2A-2E, utilize notation conventions found in the C programming language.

The PSE manages parameters in such a way that the following conditions always holds true:
management power<=user config
management power<=available power<=alloc power
PD consumption<=available power
PSE maintains the following information for each PD:
Last transmitted protocol data (lastTxPseProtData).
Last received protocol data from PD (lastRxPdProtData).
Allocated Power (allocPower)—the amount of power budgeted by the power manager for the PD.
User Configuration (userConfig)—the maximum amount of power that can be consumed by the PD powered by the PSE. The value for this field is determined by power management. This field is set by the system before PSE begins discovering PDs for powering them up. Also, the value for this field cannot be less than MinP, else the PD cannot be powered.
Last Transmitted PSE protocol data (lastTxPseProtData) includes:
Management Sequence Number (mgmtSeqNum) initially set to a non-zero random number.
Request Sequence Number (reqSeqNum) initially set to 0
Available Power (availPower) initially set to some power level as determined by power management and in FIGS. 1A-1F.
Management Power (mgmtPower) initially set to −1.
Last Received PD protocol data (lastRxPdProtData) includes:
Management sequence Number (mgmtSeqNum) initially set to 0.
Request Sequence Number (reqSeqNum) initially set to 0.
Requested Set of power levels (reqSetOfPowerLevels) initially set to empty-set.
Power Consumption (consumption) is initially set to 0.

PSE requests PD to change its consumption for either an increase or a decrease of power. Power management (or other application on PSE) can ask PD to reduce its consumption by decreasing the power level indicated by userConfig. The allocated power level is not changed at this time.

An increase in the amount of available power is indicated by increasing the power level indicated by userConfig. At this time allocPower is increased by the power management system.

A general condition that must be ensured to be true by the power management subsystem for any request is that allocPower>=max(userConfig, lastTxPseProtData.availPower).

Figure 1A:
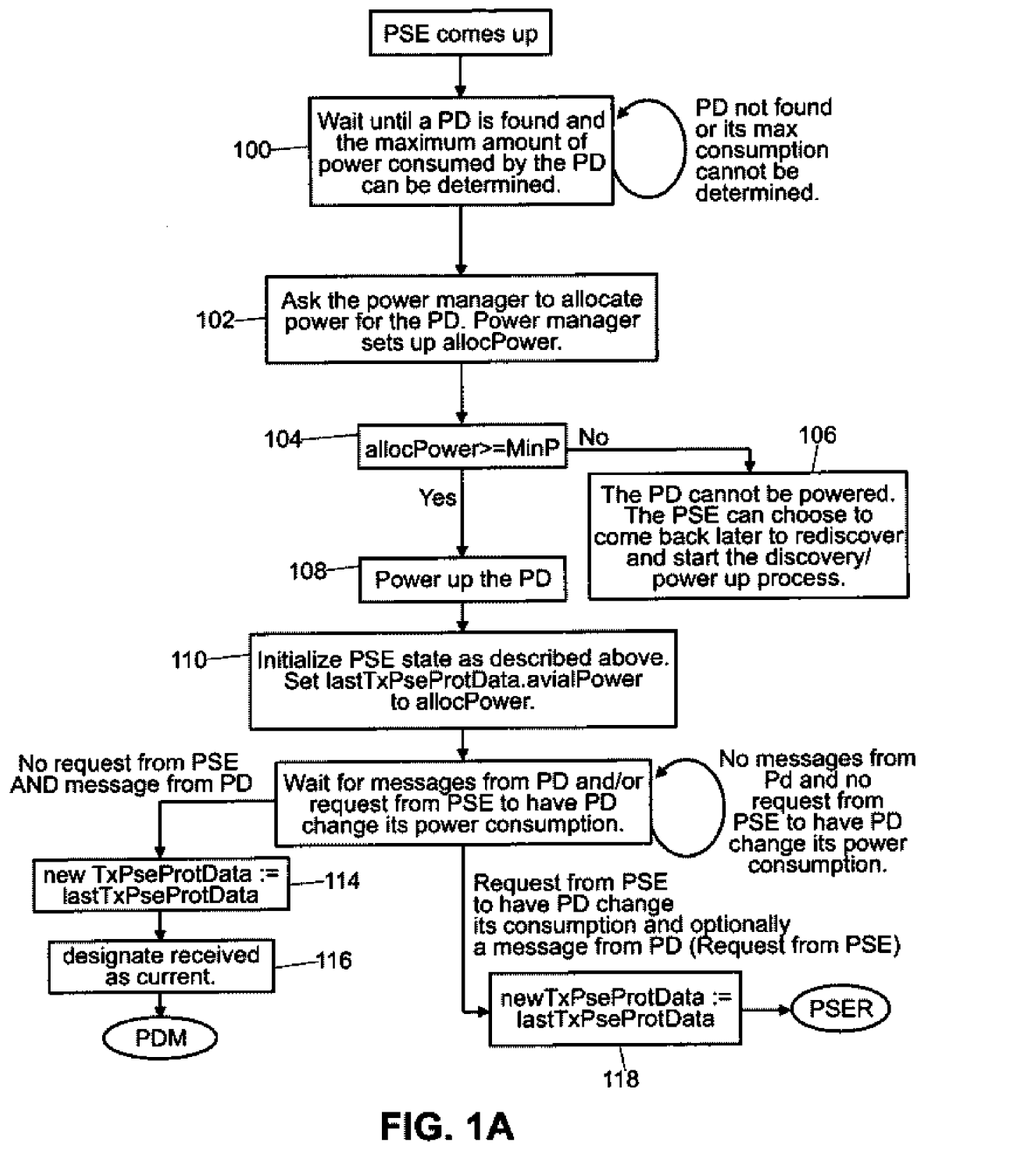
FIGS. 1A-1F illustrate various sequences of acts performed by PSEs with respect to power negotiation in accordance with the present invention.
Figure 1B:
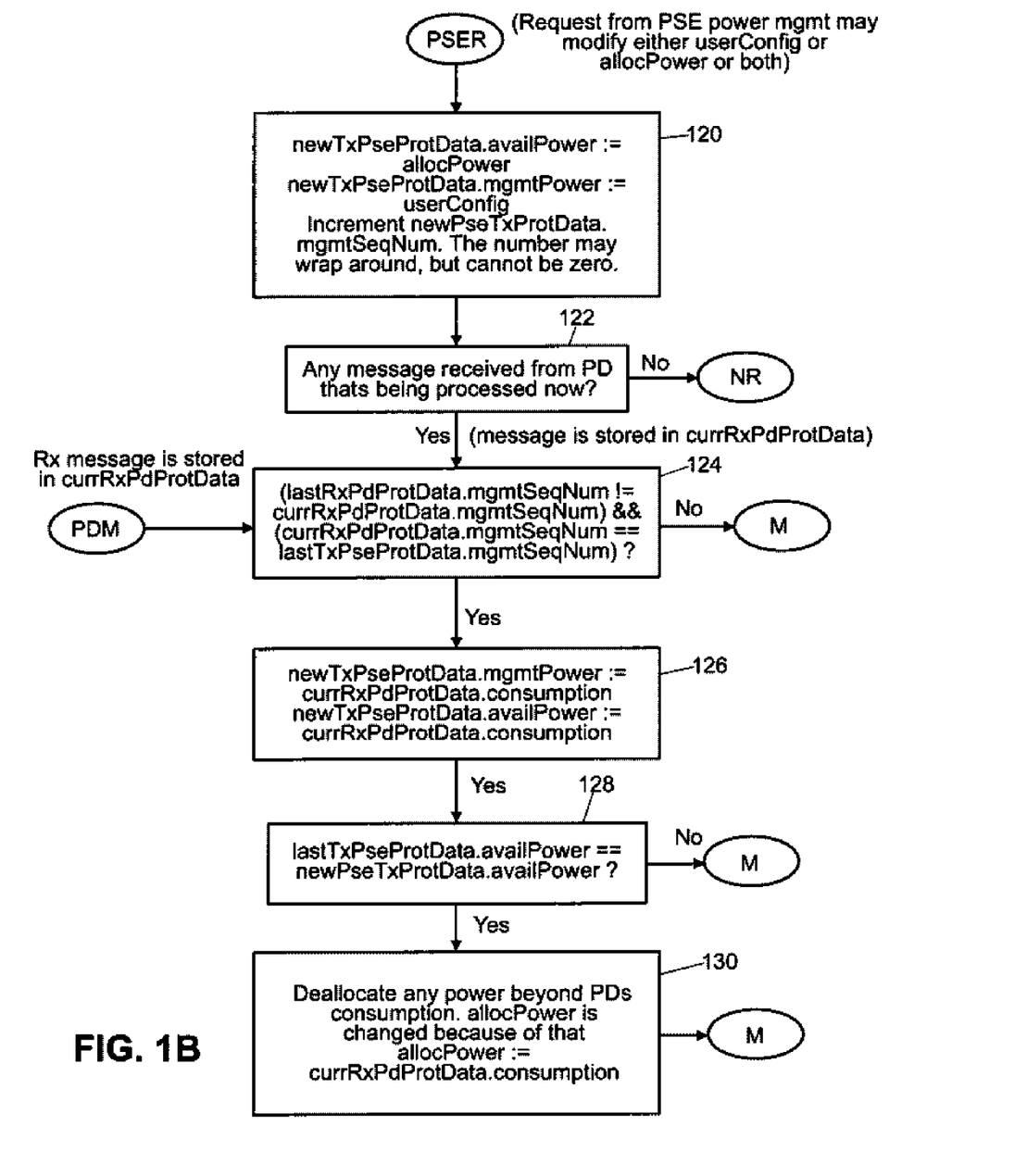

FIGS. 1A-1F illustrate various sequences of acts performed by PSEs with respect to power negotiation in accordance with the present invention. Directing attention to FIG. 1A, control begins at act 100, where the PSE discovers a PD and the maximum amount of power consumed by the PD can be determined. If a PD is not found or a PD is found but its maximum consumption level cannot be determined, act 100 is repeated until these conditions are satisfied. At act 102, the PSE requests its power manager to allocate power for the PD discovered at act 100. In response, the power manager sets a value for allocPower. At decision act 104, a determination is made as to whether allocPower exceeds MinP. If the determination has a negative result, control transitions to act 106, where it is determined that the PD cannot be powered. The PSE can choose to come back later to restart the discovery and power up process for the PD. Returning to decision act 104, if the determination has a positive result, control transitions to act 108, where the PD is powered up. The PSE state is initialized as described above, and lastTxPse.ProtData.availPower is set to allocPower (act 110). At act 112, the PSE waits for messages from the PD or the PSE's power manager that indicates the PD needs a change in its power consumption. Control loops at this act until such a message is received. If a message is received from a PD but not the power manager on the PSE, control proceeds to act 114, where newTxPseProtData is assigned the value of lastTxPseProtData. Control then transitions to act 116, where the received message is designated as the current message. Control then transitions to act 124 (FIG. 1B). Returning to act 112, if a message is received from the PSE's power manager for a consumption change on a PD (and optionally a message is also received from a PD for the consumption change), control transitions to act 118, where newTxPseProtData is assigned the value of lastTxPseProtData. Control then transitions to act 120 (FIG. 1B).

Directing attention to FIG. 1B, at act 120, newTxPseProtData.availPower is assigned the value of allocPower, newTxPseProtData.mgmtPower is assigned the value of userConfig, and newTxPseProtData.mgmtSeqNum is incremented. This sequence number value may wrap but is not allowed to be a zero value. At decision act 122, an evaluation is made as to whether any message has been received from the PD that is currently being processed. If decision act 122 has a negative result, control proceeds to act 158. If decision act 122 has a positive result, control proceeds to decision act 124, where a comparison is made between lastRxPdProtData.mgmtSeqNum and currRxPdProtData.mgmtSeqNum as well as between currRxPdProtData.mgmtSeqNum and lastTxPdProtData.mgmtSeqNum. If decision act 124 has a negative result, control transitions to act 132. Else, control transitions to act 126, where newTxPseProtData.mgmtPower is assigned the value of currRxPdProtData.consumption and NewTxPseProtData.availPower is assigned the value of currRxPdProtData.consumption. Control then proceeds to decision act 128, where a comparison is made between lastTxPseProtData.availPower and newPseTxProtData.availPower. If decision act 128 has a negative result, control transitions to act 132, else, control transitions to act 130. At act 130, the PSE deallocates any power beyond the PD's consumption value. AllocPower is changed accordingly to equal the value of currRxPdProtData.consumption.

Figure 1C:
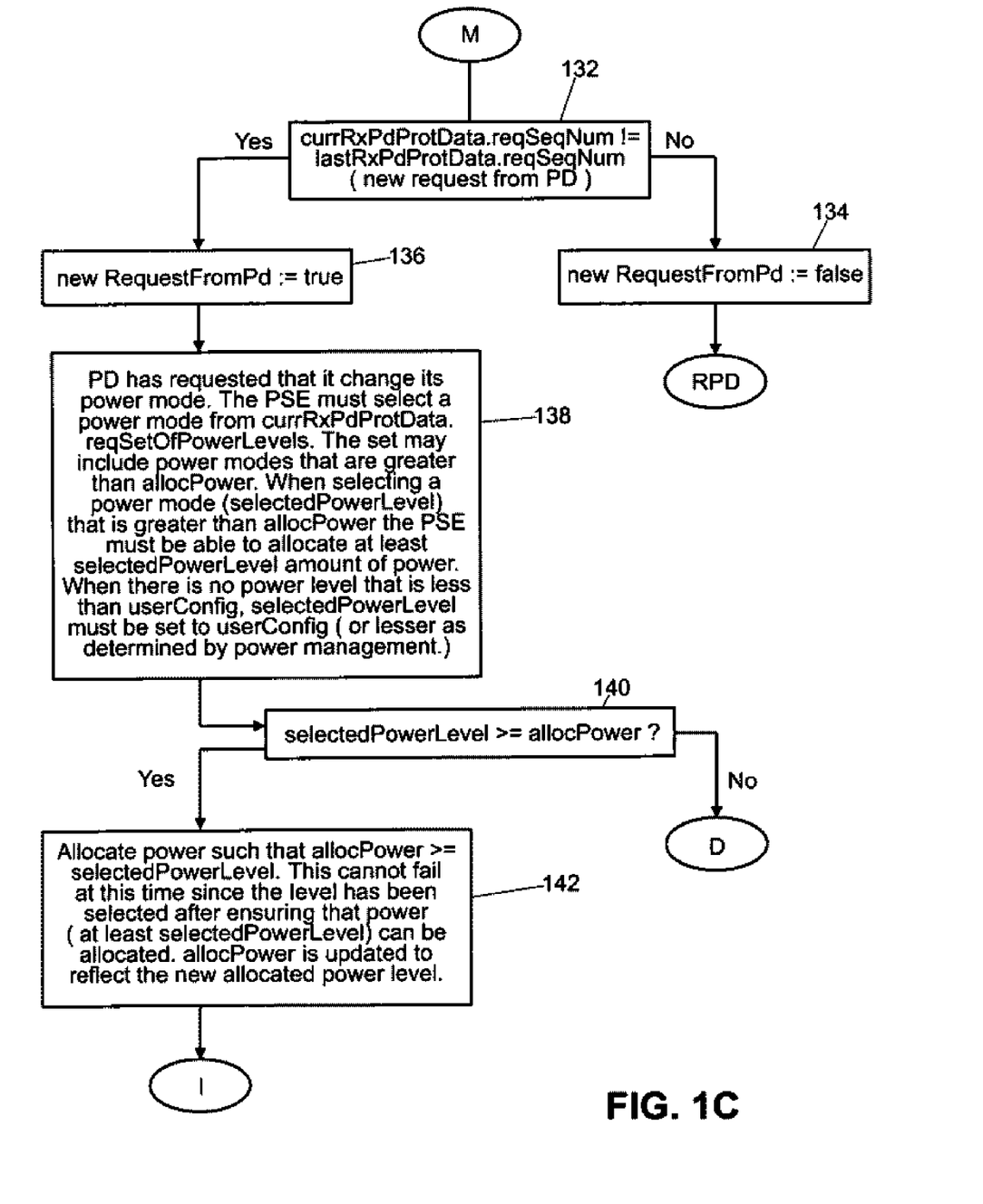

Directing attention to FIG. 1C, control transitions to decision act 132, where curreRxPdProtData.reqSeqNum is compared against lastRxPdProtData.reqSeqNum. If decision act 132 has a negative result, control transitions to act 134, where newRequestFromPd is set to false, and control transitions to act 156. Else, control transitions to act 136, where newRequestFromPd is set to true. Control transitions to act 138, where the PSE selects a power mode from currRxPdProtData.reqSetOfPowerLevels. Control transitions to decision act 140, where a comparison is made between selectedPowerLevel and allocPower. If decision act 140 has a negative evaluation, control proceeds to act 146, otherwise control transitions to act 142. At act 142, power is allocated by the PSE such that allocPower is greater or equal to selectedPowerLevel. Control then transitions to act 144.

Figure 1D:
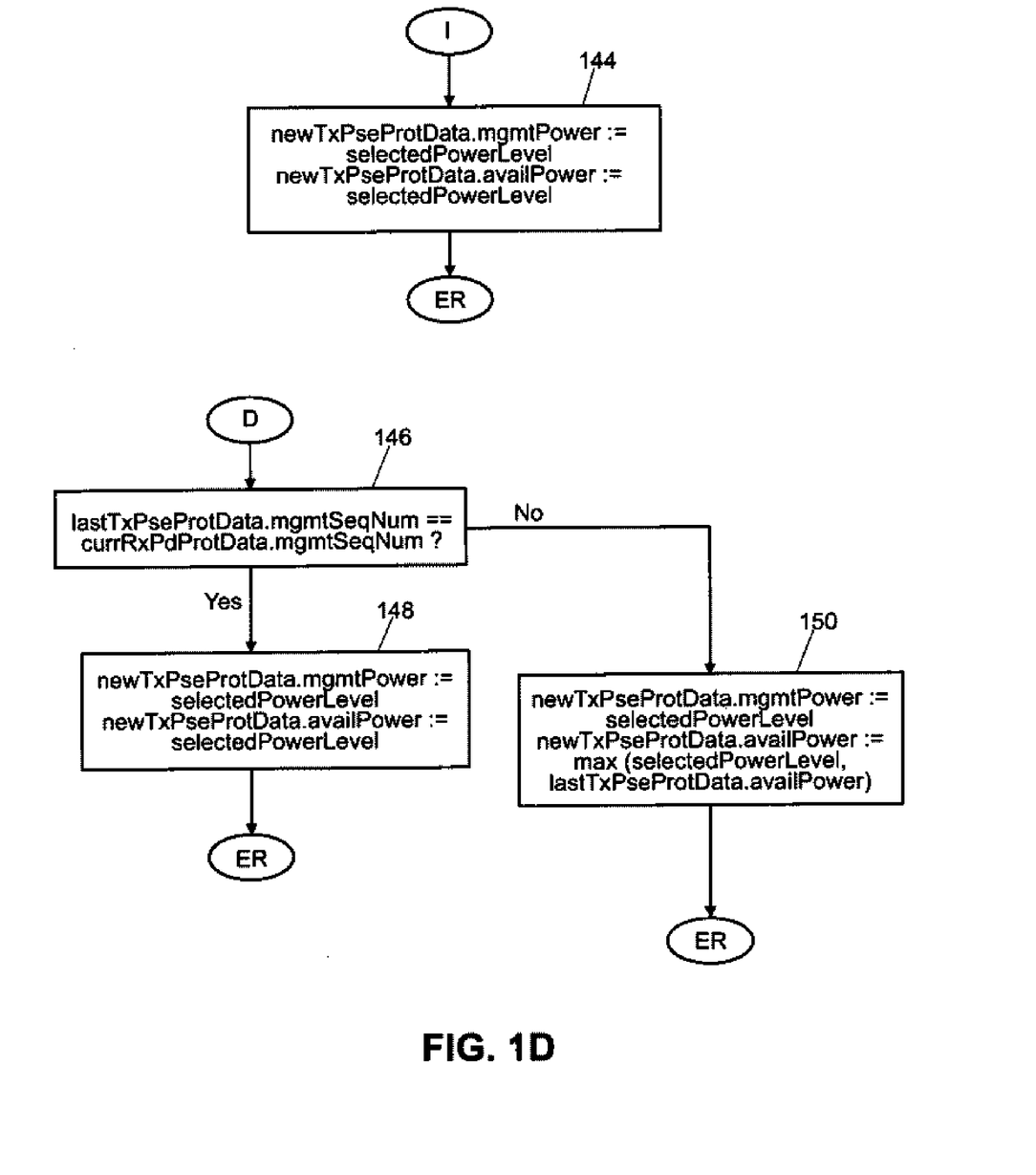

Directing attention to FIG. 1D, at act 144, newTxPseProtData.mgtPower is assigned the value of selected PowerLevel and newTxPseProtData.availPower is assigned the value of selectedPowerLevel. Control then transitions act 152. Returning to decision act 146, a comparison is made between lastTxPseProtData.mgmtSeqNum and currRxPdProtData.mgmtSeqNum. If decision act 146 has a positive evaluation, control transitions to act 148, where newTxPseProtData.mgmtPower is assigned the value of selectedPowerLevel and newTxPseProtData.availPower is assigned the value of selectedPowerLevel. Control then proceeds to decision act 152. Returning to decision act 146, if decision act 146 has a negative evaluation, control proceeds to act 150, where newTxPseProtData.mgmtPower is assigned the value of selectedPowerLevel and newTxPseProtData.availPower is assigned the greater of the values of selectedPowerLevel and lastTxPseProtData.availPower. Control then proceeds to decision act 152.

Figure 1E:
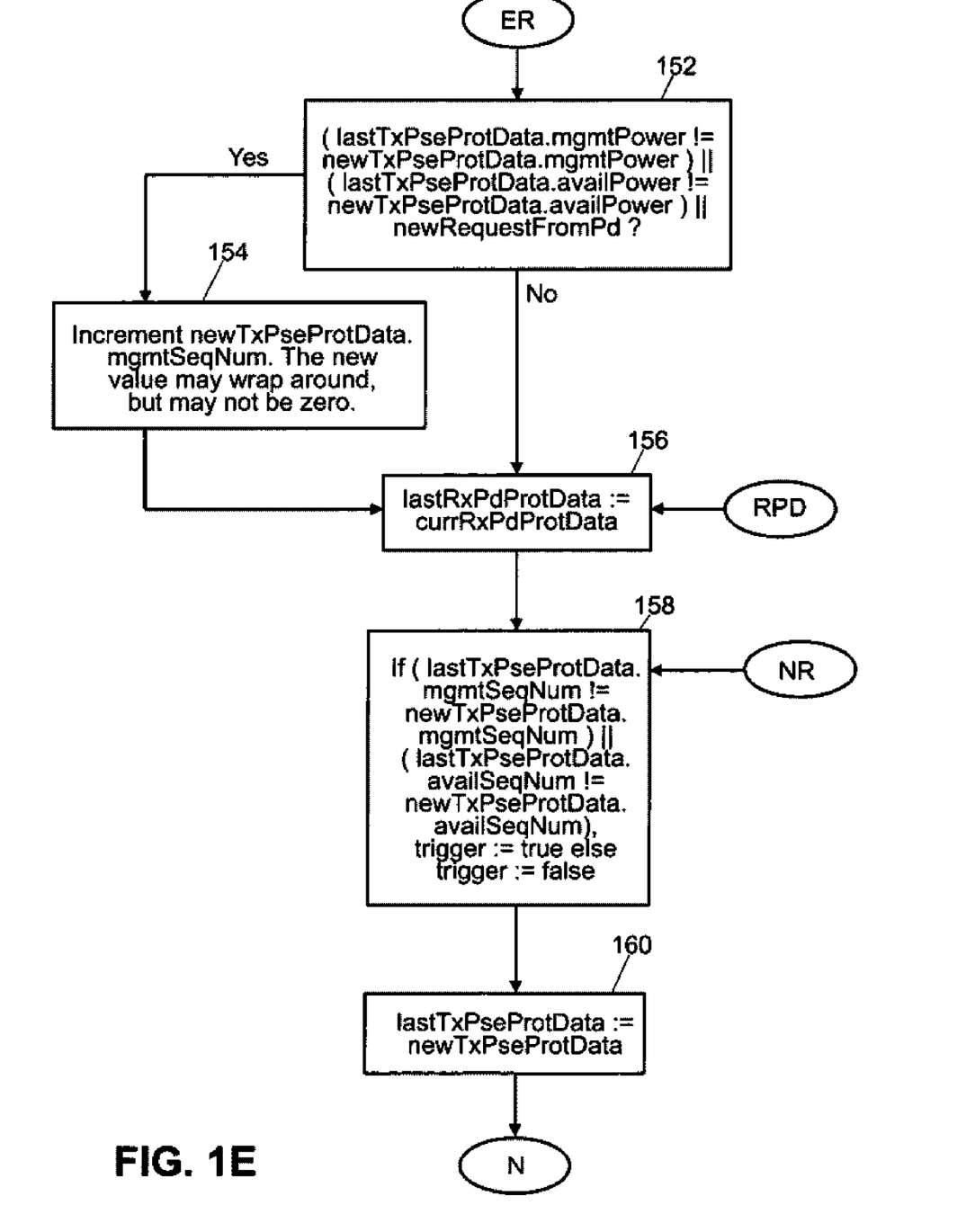

Directing attention to FIG. 1E, at decision act 152, several conditions are checked. If lastTxPseProtData.mgmtPower is different from newTxpseProtData.mgmtPower or lastTxPseProtData.availPower is different from newTxPseProtData.availPower or a newRequestFromPd is received, control transitions to act 154, where newTxPseProtData.mgmtSeqNum is incremented. Control transitions to act 156, where lastRxPdProtData is assigned the value of currRxPdProtData. Control then transitions to act 158, where, if lastTxPseProtData.mgmtSeNum is not equal to newTxPseProtData.seqNum or lastTxPseProtData.availSeqNum is not equal to newTxPseProtData.availSeqNum, then trigger is set to true; else trigger is set to false. Control then transitions to act 160. At act 160, lastTxPseProtData is assigned the value of newTxPseProtData. Control then transitions to act 162.

Figure 1F:
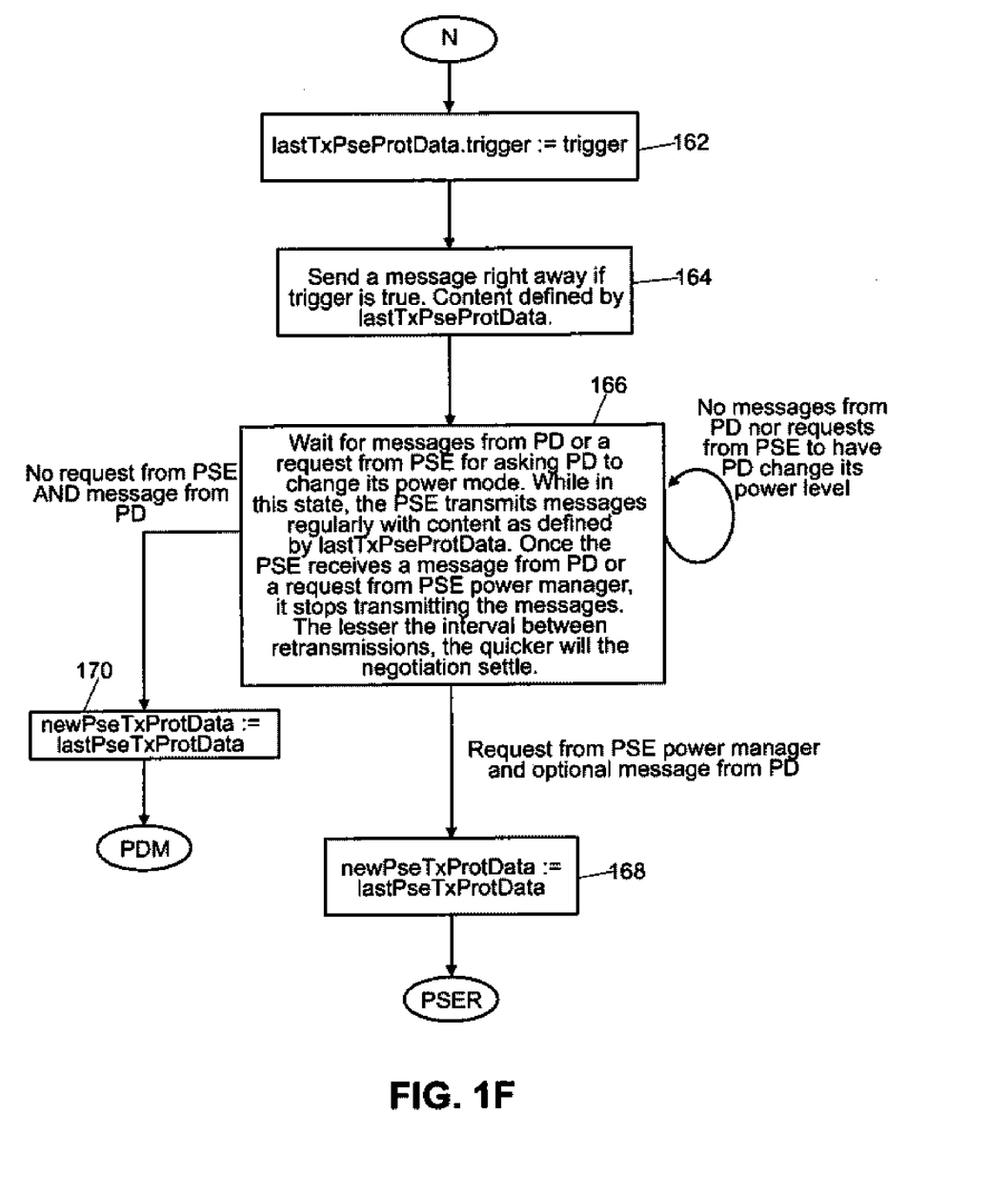

Directing attention to FIG. 1F, at act 162, lastTxPseProtData.trigger is assigned the value of trigger. Control transitions to act 164. At act 164, a message is sent if trigger has a true value, the content of the message is defined by the data contained in lastTxPseProtData. Control then proceeds to act 166. At act 166, the PSE waits for messages from the PD or a request from the PSE's power manager that ask for a change in the PD's power mode. While in this state, the PSE transmits messages regularly with content defined by lastTxPseProtData. Once the PSE receives a message from a PD or a request from the PSE's power manager, it stops transmitting messages. The lesser the interval between retransmissions, the quicker the power negotiation will settle.

If a request is received from the PSE's power manager (and optionally a message is also received from a PD), control proceeds to act 168, where newPseTxProtData is assigned the value of lastPseTxProtData. Control then returns to act 120. If no request is received from the PSE's power manager but a message is received from a PD, control transitions to act 170, where newPseTxProtData is assigned the value of lasstPseTxProtData, and control returns to act 124.

FIGS. 2A-2E illustrate various sequences of acts performed by PDs with respect to power negotiation in accordance with the present invention. Directing attention to FIG. 2A, at act 200, the PD comes up consuming not more than the power consumption level specified by MinP. At act 202, the state of the PD is initialized as described above. At act 204, messages are sent at intervals by the PD. The contents of the messages are defined by the PD protocol packet data described above. Transmission of the messages is performed in parallel with the wait for messages from the PSE and a power mode change request from the PD as described below. Control proceeds to act 206, where the PD waits for a message from the PSE or a request from the PD's power manager for a change in the PD's power consumption. If no message is received from the PSE by a request is received from the PD's power manager, control proceeds to act 208, where the PD stops transmitting messages. Control proceeds from act 208 to act 254. If messages are received from the PSE and optionally a power mode change request is also received from the PD's power manager, control proceeds to act 210, where the PD stops transmitting messages and currRxProtData is assigned the contents of the message received from the PSE (act 212). Control proceeds to decision act 214, where a comparison is made between currRxPseProtData.availPower and a zero value. If decision act 214 has a positive evaluation, control transitions to act 216. If decision act 214 has a negative evaluation, control transitions to act 232.

Figure 2A:
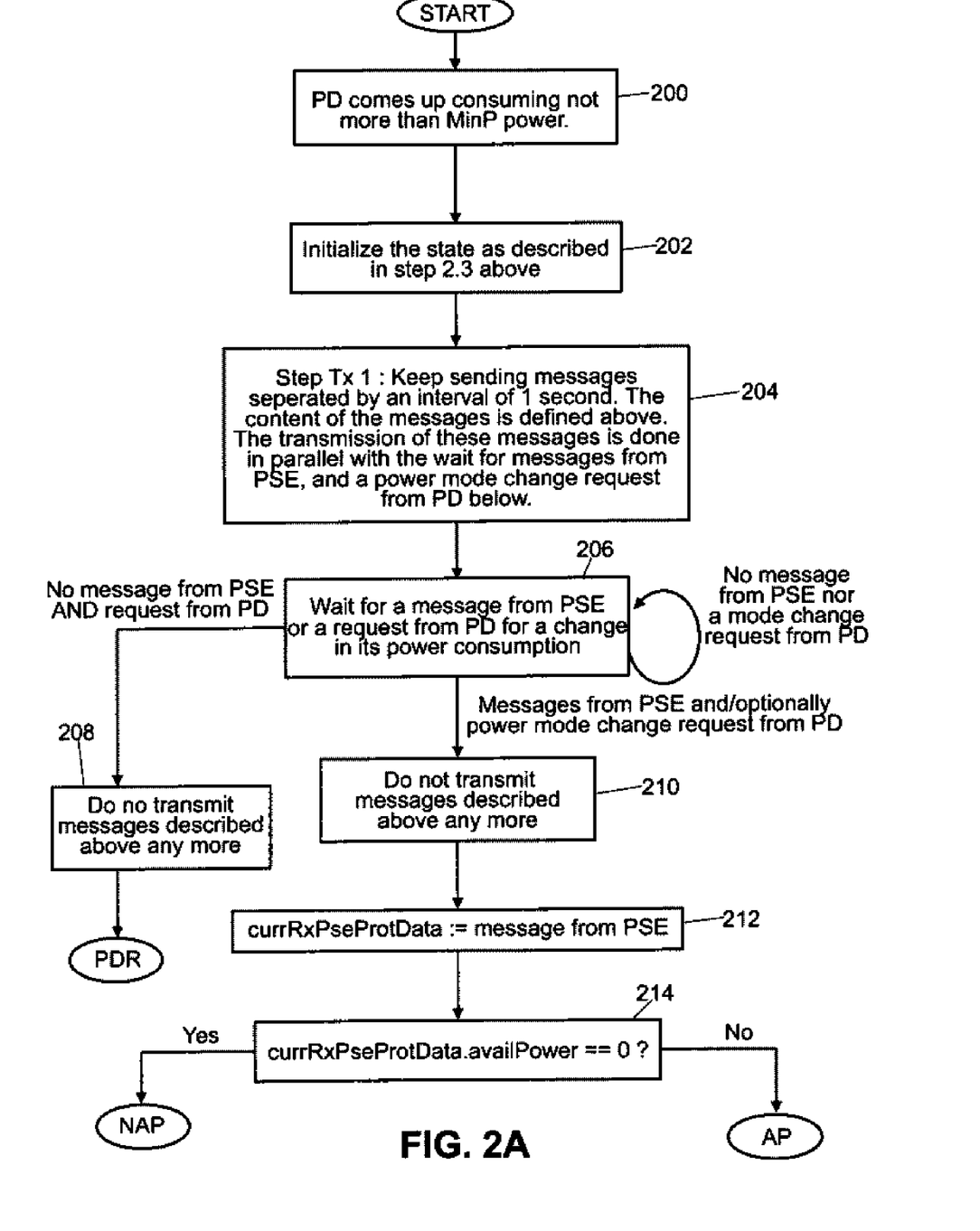
FIGS. 2A-2F illustrate various sequences of acts performed by PDs with respect to power negotiation in accordance with the present invention.
Figure 2B:
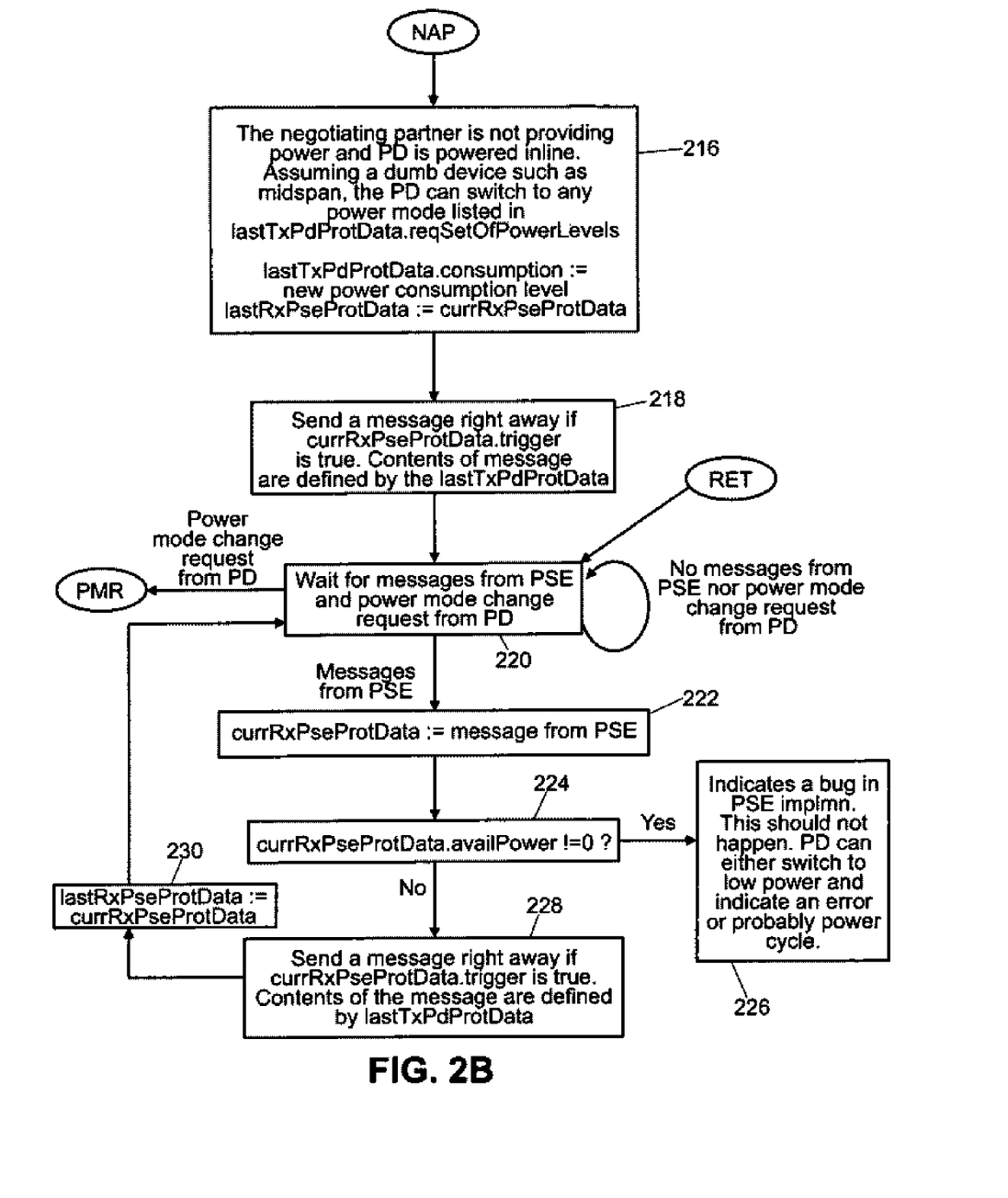

Directing attention to FIG. 2B, the negotiating partner is not providing power and the PD is powered inline. Assuming a dumb device such as midspan (which adds power), the PD can switch to any power mode listed in lastTxPdProtData.reqSetOfPowerLevels. lastTxPdProtData.copnsumption is assigned the value of new power level consumption level and lastRxpseProtData is assigned currRxPseProtData. Control then transitions to act 218. At act 218, a message is sent right away if currRxPseProtData.trigger contains a value of true. The contents of the message are defined by lastTxPdProtData. Control then transitions to act 220, where the PD waits for messages from the PSE and power mode change requests from the PD's power manager. If a power mode change request is received from the PD's power manager, control transitions to act 276. If a message is received from the PSE, control transitions to act 222, where currRxPseProtData is assigned the message received from the PSE. Control proceeds to decision act 224, where currRxPseProtData.availPower is compared to a non-zero value. If decision act 224 has a positive evaluation, this indicates a problem with the PSE. The PD can either switch to low power and indicate an error or, in the alternative, power cycle. If decision act 224 has a negative evaluation, control transitions to act 228, where a message is sent right away to the PSE if currRxPseProtData.trigger is set to true. The contents of this message are defined by lastTxPdProtData. Control then transitions to act 230, where lastRxPseProtData is assigned the value of currRxPseProtData, and control loops back to act 220.

Figure 2C:
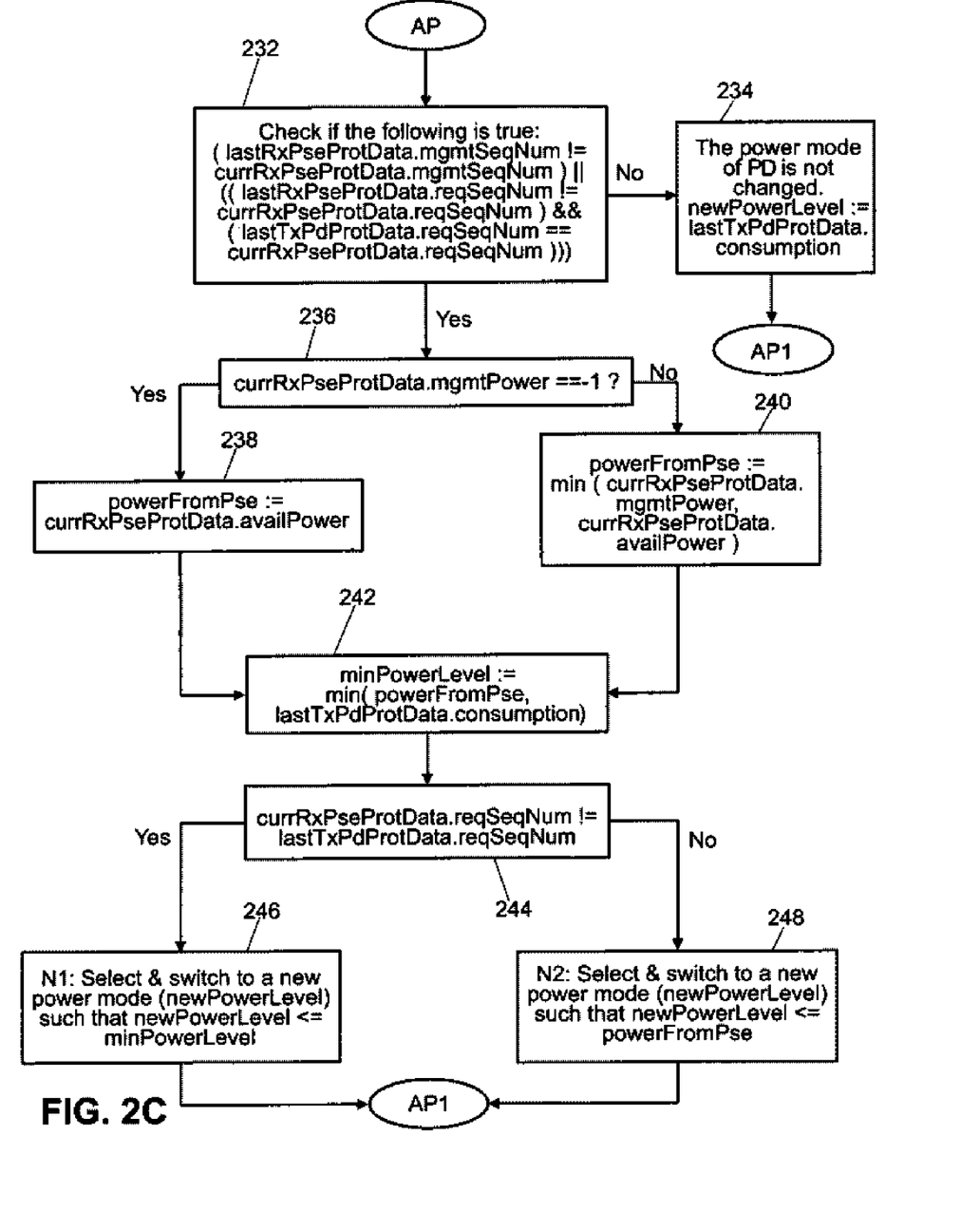

Directing attention to FIG. 2C, at decision act 232, comparisons are made between lastRxPseProtData.mgmtSeqNum and currRxPseProtData.mgmtSeqNum; between lastRxPseProtData.reqSeqNum and currRxPseProtData.reqSeqNum as well as lastTxPdProtData.reqSeqNum and currRxPseProtData.reqSeqNum. If decision act 232 has a negative evaluation, control transitions to act 234, and the power mode of PD is not changed. NewPowerLevel is assigned the value of lastTxPdProtData.consumption and control transitions to act 250. If decision act 232 has a positive evaluation, control proceeds to decision act 236, where a comparison is made between currRxPseProtData.mgmtPower and the value of −1. If decision act 236 has a negative evaluation, control proceeds to act 240, where powerFromPse is assigned the lesser value of currRxpseProtData.mgmtPower and currRxPseProtData.availPower. If decision act 236 has a positive evaluation, powerFromPse is assigned currRxPseProtData.availPower. Acts 238 and 240 transition to act 242, where minPowerLevel is assigned the lesser of powerFromPse and lastTxPdProtData.consumption. Control proceeds to decision act 244, where a comparison is made between currRxpseProtData.reqSeqNum and lastTxPdProtData.reqSeqNum. If decision act 244 has a positive evaluation, control proceeds to act 246, where the PD selects and switches to a new power mode (newPowerLevel) such that newPowerLevel does not exceed MinP. If decision act 244 has a negative evaluation, control proceeds to act 248, where the PD selects and switches to a new power mode (newPowerLevel) such that newPowerLevel does not exceed powerFromPse. Control transitions from acts 246 and 248 to act 250.

Figure 2D:
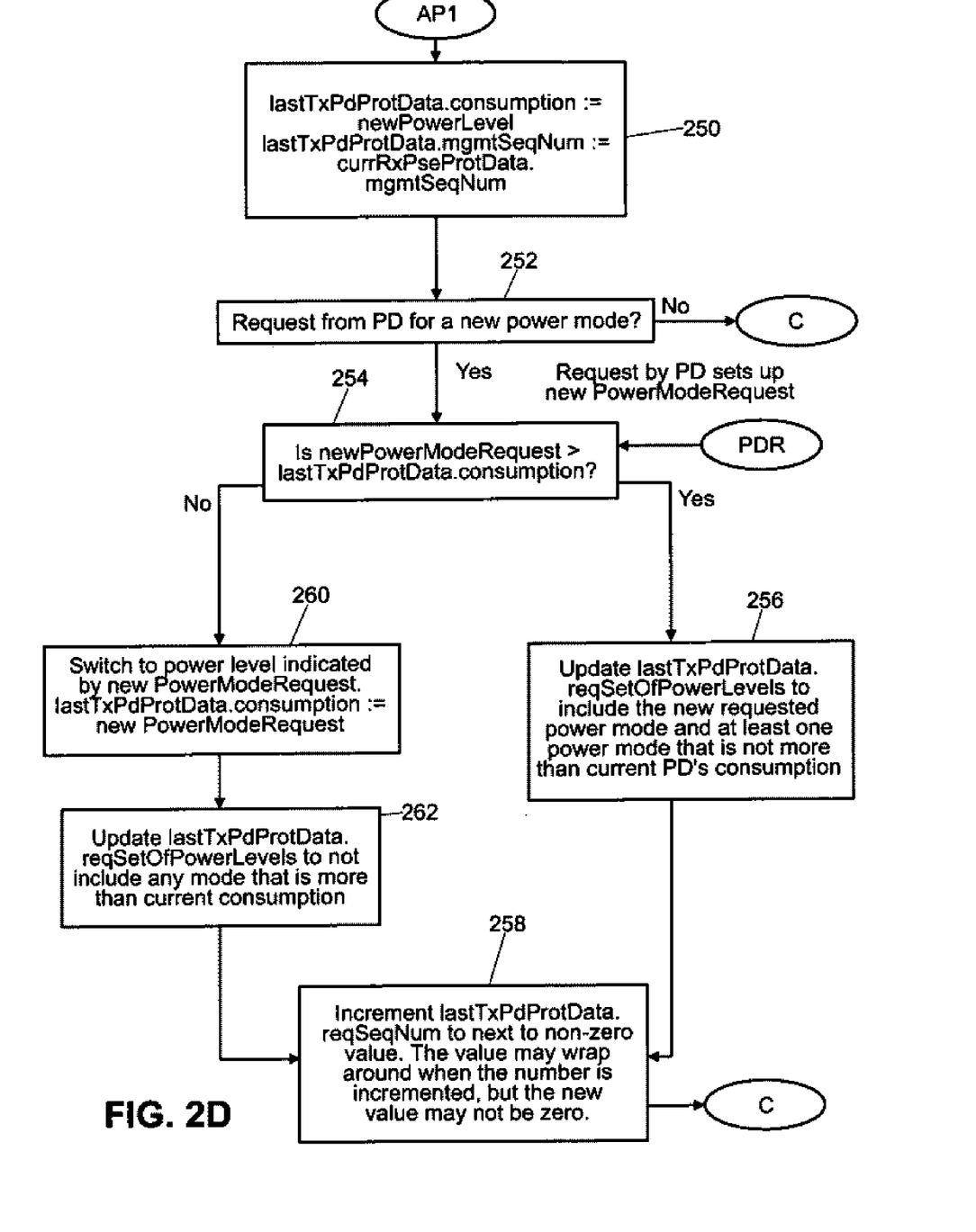

Directing attention to FIG. 2D, at act 250, lastTxPdProtData.consumption is assigned the value of newPowerLevel and lastTxPdProtData.mgmtSeqNum is assigned the value of currRxPseProtData.mgmtSeqNum. Control proceeds to decision act 252, where a check is made to determine whether the PD's power manager has requested a new power mode. If decision act 252 has a negative evaluation, control proceeds to act 264. otherwise, control proceeds to decision act 254, where a comparison is made between newPowerModeRequest and lastTxProtdata.consumption. If decision act 254 has a positive evaluation, control proceeds to act 256, where lastTxPdProtData.reqSetOfPowerLevels is updated to include the new requested power mode and at least one power mode that's not more than the current PD's consumption level. Control transitions to act 258, where lastTxPdProtData.reqSeqNum is incremented to the next non-zero value. Returning to decision act 254, if decision act 254 has a negative evaluation, control proceeds to act 260, where the PD switches to the power level indicated by newPowerModeRequest, and lastTxPdProtData.consumption is assigned the value of newPowerModeRequest. Control proceeds to act 262, where lastTxPdProtData.reqSetOfPowerLevels is updated to not include any mode that is more than current consumption. Control then proceeds to act 258, described above. Control transitions from act 258 to decision act 264.

Figure 2E:
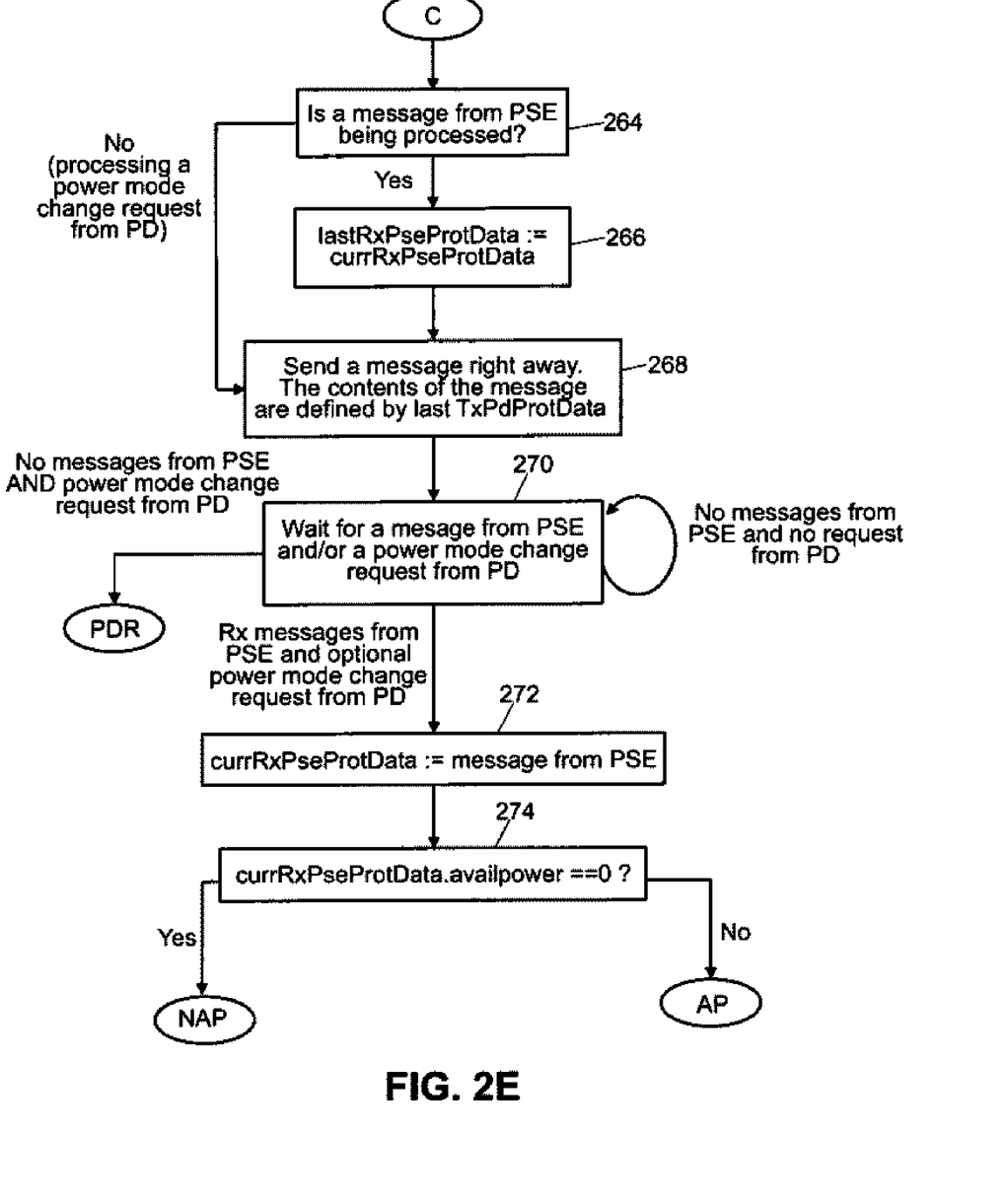

Directing attention to FIG. 2E, at decision act 264, if a message from a PSE is being processed, control proceeds to act 266, where lastRxPseProtData is assigned the value of currRxpseProtData. Control then proceeds to act 268. If decision act 264 has a negative evaluation, control skips act 266 and proceeds directly to act 268. At act 268, the PD sends a message right away to the PSE. The contents of the message are defined by lastTxPdProtData. Control transitions to act 270, where the PD waits for a message from the PD and/or a power mode change request from the PD's power manager. If no messages are received from the PSE and a power mode change request is received from the PD's power manager, control returns to act 254. If messages are received from the PSE and optionally a power mode change request is also received from the PD's power manager, control transitions to act 272, where currRxPseProtData is assigned the message received from the PSE. Control proceeds to decision act 274, where a comparison is made between currRxPseProtData.availPower and a zero value. If decision act 274 has a positive evaluation, control returns to act 216, otherwise control returns to act 232.

Figure 2F:
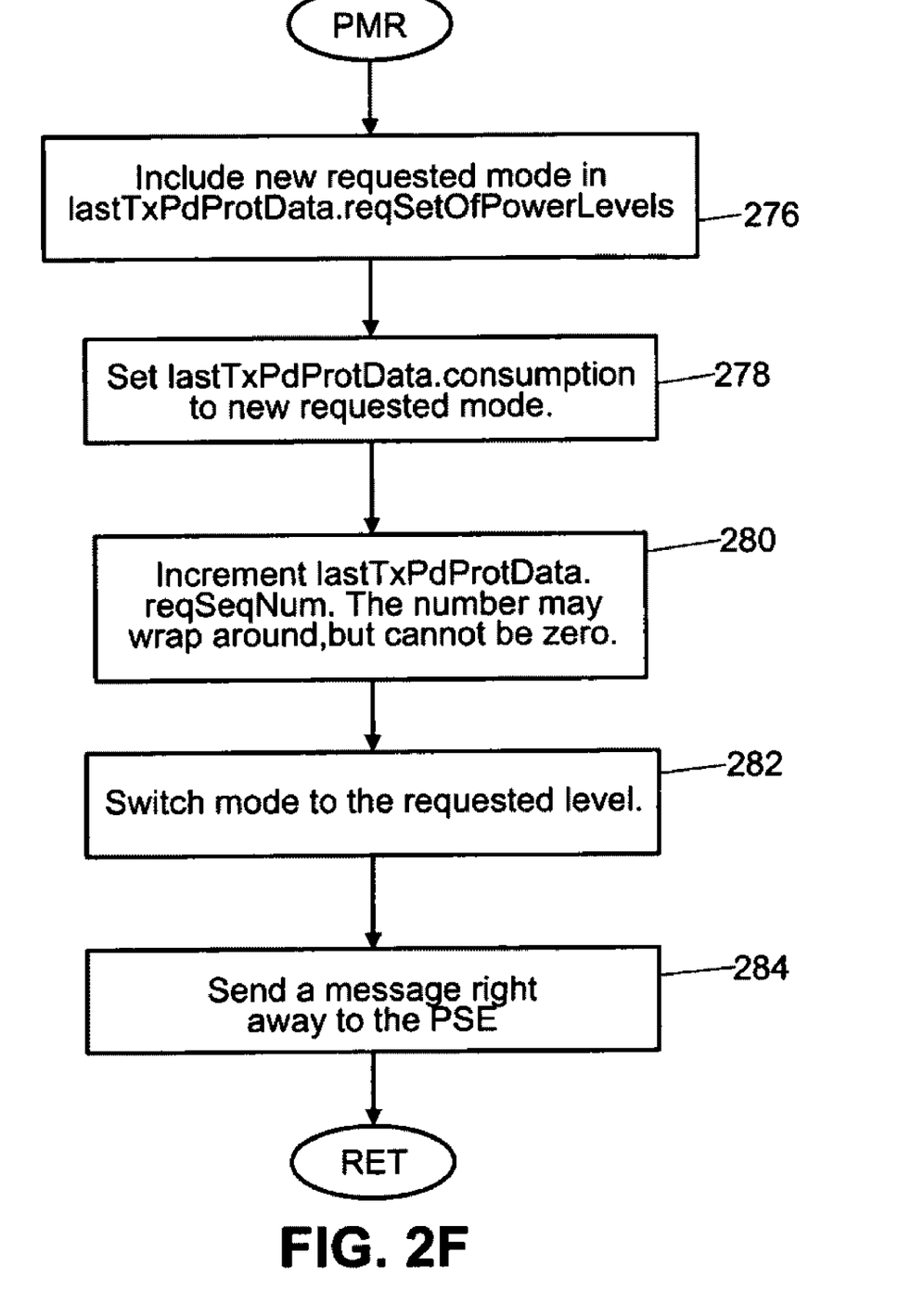

Directing attention to FIG. 2F, at act 276 the new requested mode is included in lastTxPdProtdata.reqSetOfPowerLevels. Control proceeds to act 278, lastTxPdProtData.consumption to the new requested mode. At act 280, lastTxPdProtData.reqSeqNum is incremented. The PD switches to the requested mode at act 282, and a message is sent to the PSE at step 284.

While FIGS. 1A-1F describe a sequence of acts carried out by a PSE in accordance with the present invention, it is to be understood that these acts may be embodied in software instructions encoded on the PSE. Alternatively, these acts may also be embodied through hardware included in the PSE. Likewise, while FIGS. 2A-2F describe a sequence of acts carried out by one or more PDs in accordance with the present invention, it is to be understood that these acts may be embodied in software instructions encoded on the PD. Alternatively, these acts may also be embodied through hardware included in the PD.

While a method and apparatus for negotiating power between PSE and PD have been described and illustrated in detail, it is to be understood by those skilled in the art that many modifications and changes can be made to various embodiments of the present invention without departing from the spirit thereof.

What is claimed is:

1. A method of negotiating power between power supplying equipment and at least one powered device, comprising:
    discovering a powered device and determining a maximum amount of power the device can consume;
    requesting an allocation of power for the powered device;
    powering up the powered device;
    initializing a power sourcing equipment state indicating the allocation of power;

if a first message is received from the powered device and no request for a change in power is made by the power sourcing equipment then designating the received message as a current message;

if a request is received from the power sourcing equipment to have the powered device chance its power consumption then determine that the powered device has requested a change in a power mode associated with the power device, the power mode having a selected power level that is higher than the allocation of power and designating the request received from the powered device as the current message;

increasing the allocation of power for the powered device to a power level indicated by the current message.

* * * * *